Figure 1:
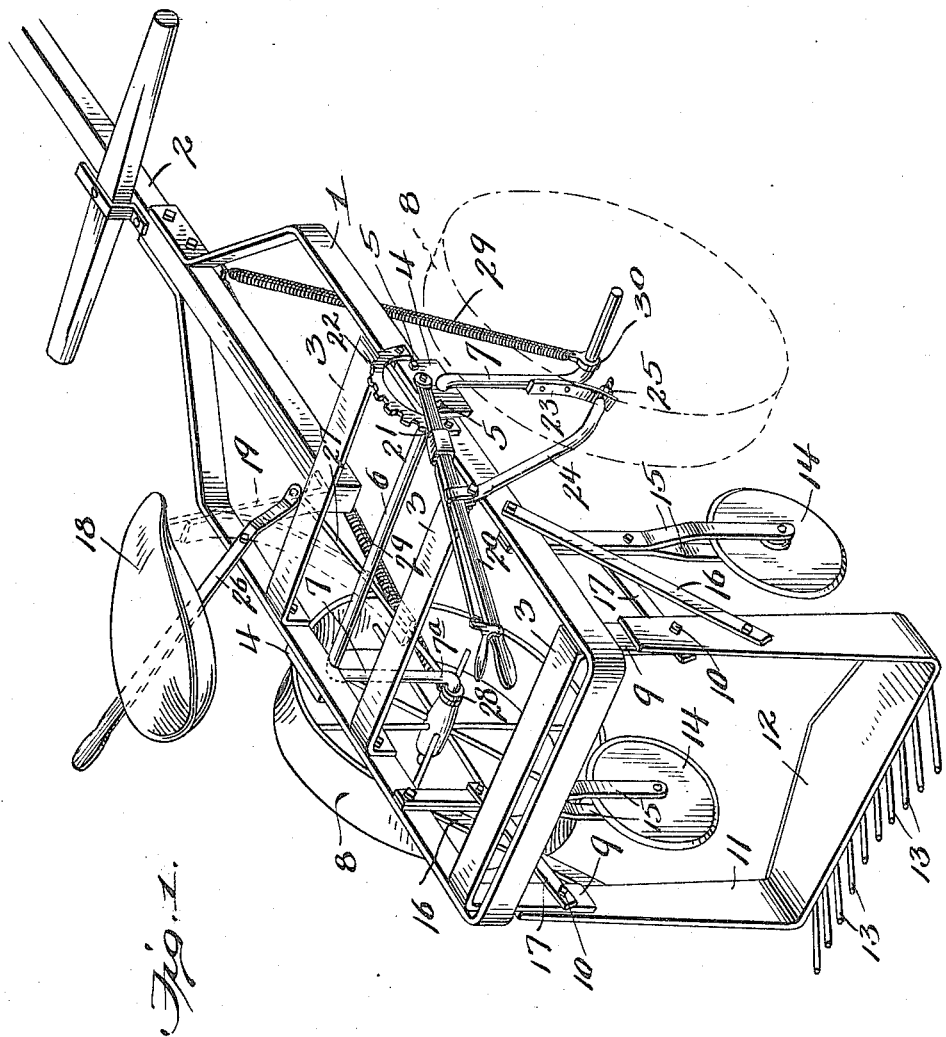

W. J. ADAMS & J. W. TOWNSEND.
POTATO DIGGER.
APPLICATION FILED JUNE 4, 1915.

1,184,605.

Patented May 23, 1916.
2 SHEETS—SHEET 1.

Witnesses:

Inventors
William J. Adams
James W. Townsend
by
James L. Norris,
Attorney

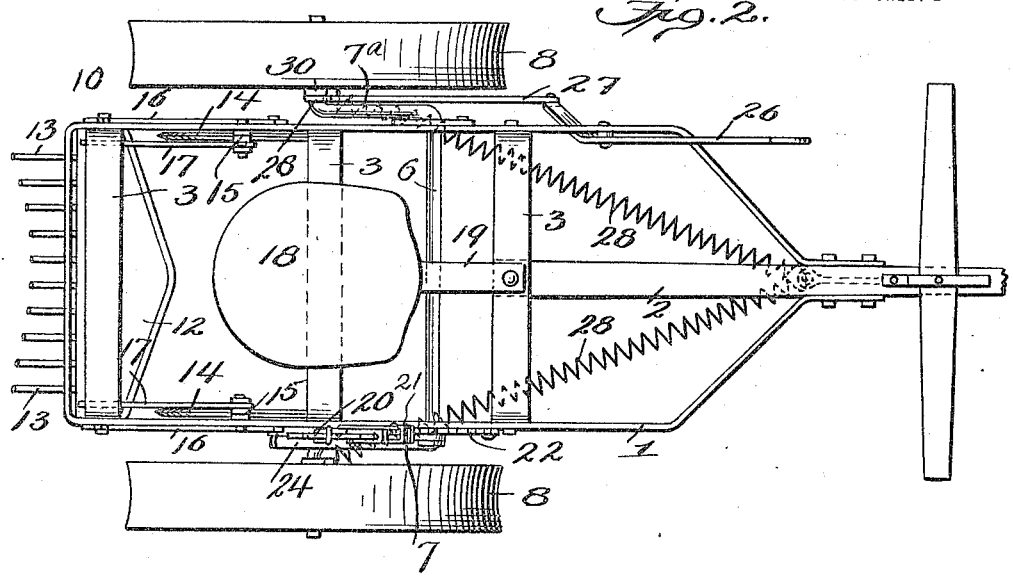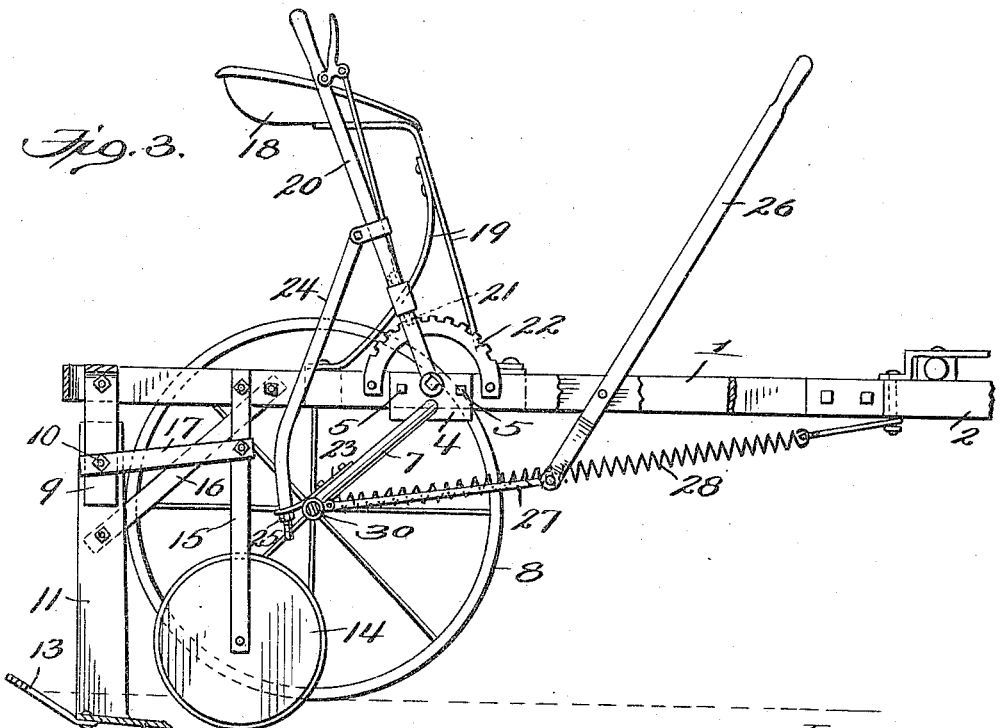

UNITED STATES PATENT OFFICE.

WILLIAM J. ADAMS AND JAMES W. TOWNSEND, OF LAUREL, DELAWARE, ASSIGNORS OF ONE-THIRD TO CHRISTOPHER C. ELLIS, OF LAUREL, DELAWARE.

POTATO-DIGGER.

1,184,605. Specification of Letters Patent. Patented May 23, 1916.

Application filed June 4, 1915. Serial No. 32,150.

*To all whom it may concern:*

Be it known that we, WILLIAM J. ADAMS and JAMES W. TOWNSEND, citizens of the United States, residing at Laurel, in the county of Sussex and State of Delaware, have invented new and useful Improvements in Potato-Diggers, of which the following is a specification.

The invention relates to potato diggers and has for its object the production of a simple and inexpensive construction which will be effective in its purpose and efficient in operation.

One feature of the invention is to produce a novel construction of potato digger with an adjustable means for raising and lowering the digger into operative and inoperative position.

Another feature of the invention resides in the provision of a novel adjustment means for potato diggers that will facilitate the positioning of the digger in operative and inoperative position, with respect to the ground.

The invention further consists in other features of construction which reside in the novel arrangement of parts and combination of elements which will be hereafter more fully described and finally pointed out in the appended claims.

In the drawings: Figure 1 is a perspective view of the invention, showing the digger proper in inoperative position; Fig. 2 is a plan view of the invention, as shown in Fig. 1; and Fig. 3 is a side sectional elevation of the invention, so taken as to clearly show the operating parts and detail construction thereof.

Similar reference characters denote similar like parts throughout the specification and drawings.

Referring particularly to the drawings, 1 denotes a substantially rectangular frame having the draft tongue 2 suitably secured to the forward end of the frame. Secured to and extending transversely of the frame 1 are the spaced brace members 3, so arranged as to increase the rigidity of the frame. Bearing plates 4 are secured by means of the fastening members 5 to the opposite outer sides of the frame 1 substantially at the middle thereof. These bearing plates 4 are provided with suitable openings to receive the axle or shaft 6. The free ends of the shaft 6 are suitably formed to provide the crank axles 7 adapted to be supported by the traction wheels 8.

The ends of the rear brace member 3 are extended downwardly to form the arms 9 to which is secured by the bolt 10, or other suitable securing means, the free ends of the substantially U-shaped member 11. The closed end of the member 11 is formed to provide the scoop or plow 12 having a tapered forward end and being provided on its opposite or rear edge with a plurality of fingers 13 extending upwardly and rearwardly of the plow 12. The fingers 13 consist of a comparatively short central finger and a plurality of fingers of gradually increasing length projecting from the rear edge of the plow 12 on opposite sides of said central finger. This peculiar construction and arrangement of fingers in practice has been found very efficient in separating the potatoes from the soil and for concentrating the discharge of the potatoes from the plow in a substantially straight line from said central finger, whereby the rows of potatoes dug are discharged from the plow in unscattered rows. The rotary disks 14 are arranged between the axle shaft 6 and plow 12 and are supported in position by the depending members 15 secured to the sides of the frame 1, as clearly shown in Figs. 1 and 3. Braces 16 and 17 are provided between the members 11 and 15 and the frame 1 to increase the rigidity of the parts mentioned with the frame 1.

The rotary disks 14 are suspended from the sides of the frame 1 so as to be positioned substantially on opposite sides of the plow 12 and are to proceed in advance of the latter to produce a strip of ground to be acted upon by the plow 12. This invention is particularly adapted for the harvesting of sweet potatoes, the rotary disks 14 being adapted to straddle the row of potatoes and to divide the same from the rest of the bed. The potatoes in the divided row are then scooped up by the plow 12, and as the digger proceeds forwardly, the potatoes and broken soil pass over the plow to the fingers 13 where the soil will be sieved through between the fingers. The potatoes will then pass over the fingers and be left substantially upon the top of the soil. A seat 18 is suitably supported on the frame 1. In the present showing, however, the seat is illustrated as being supported by the supporting members 19 secured to the transverse braces 3 of the frame, the seat 18 being adapted to lie substantially over the shaft 6.

It is contemplated by this invention to provide suitable means for raising and lowering the plow 12 and disks 14 to and from operative position, and also to provide suitable mechanism that will facilitate this operation or adjustment. Therefore, we have provided a main operating lever 20 having one end pivoted to the bearing plate 4 on the right-hand side of the frame and having a spring-actuated dog 21 adapted to engage the segmental rack 22 secured to the frame 1. The usual grip releasing means are provided to coöperate with the lever 20 to raise the dog from engagement with the teeth of the rack 22. Secured to the right-hand crank axle is an arm or rigid projection 23 connected to the lever 20, above its fulcrum point, by the adjustable link 24. By having the link 24 adjustable by means of the nut 25, the angle of the main operating lever 20 may be varied relative to the seat 18, which adjustment will be found advantageous to operators varying in height. At the opposite or left-hand side of the frame 1 and in advance of the seat 18 and shaft 6 is pivoted, intermediate its ends, an auxiliary or assisting operating lever 26. The lower end of the lever 26 has connection with the left-hand crank axle 7ª of the digger by means of the link 27. The link 27 is connected with said crank axle by an annular collar 28 surrounding the same.

From the above arrangement of adjusting levers, it will be seen that when it is desired to lower the plow 12 and rotary disks 14 to operative position, the lever 20 is operated from a position shown in Fig. 1 to the position shown in Fig. 3. This lever, through the medium of the link 24, pulls upon the axle 7 and raises the traction wheels 8, thus permitting the frame 1 to lower with respect to the wheels 8. The lever 20 and the auxiliary or assisting operating lever 26 actuate in unison and in the same direction. However, the effective operation of the assisting lever 26 is only brought into play after a predetermined time during the operation of the main operating lever 20, or what may be termed the center of operation of the lever 20, see Fig. 3. The assisting lever 26 according to its disposition and connection with the left-hand crank axle 7ª exerts a pushing force upon the latter and carries the axles 7 and 7ª into the final position shown in Fig. 3, it being understood that when the main operating lever 20 arrives at a substantially upright position the operator sitting upon the seat 18 can exert but little throw on the lever 20, and consequently, the operation of the device is facilitated and expedited by the operation of the lever 26.

When it is desired to raise the plow 12 and the rotary disks 14 from operative position to an inoperative position, shown in Fig. 1, the main operating lever 20 is released from the ratchet segment 22 and lowered toward a position shown in Fig. 1, thereby exerting a pushing action against the crank axle 7 so as to lower the traction wheels 8. After a predetermined period, but during the operation of the lever 20, the force exerted upon the lever 20 is less effective than when the latter is first operated. At this time the lever 26 is moved from a position shown in Fig. 3 toward a position shown in Fig. 1 and exerts a pull upon the crank axle 7ª to carry both of the crank axles 7 and 7ª to a position shown in Fig. 1, past what may be termed the center of operation of the lever 20.

It will be apparent that by the connection and arrangement of the levers 20 and 26 with respect to the crank axles 7 and 7ª, these levers operate or move in the same direction to produce the raising and lowering of the frame from operative to inoperative position, and consequently, these levers may be grasped by opposite hands of the operator and actuated substantially simultaneously in one direction to produce the desired position of the digger. A pair of helical springs 29 are provided and have their forward ends secured to the tongue 2 and their rear ends to the crank axles 7 and 7ª, respectively, by means of the collar 30. The function of these springs is to keep the tongue from moving upwardly and to assist in moving the crank axles from operative to inoperative position, or in other words, from a position shown in Fig. 3 to a position shown in Fig. 1.

The foregoing is a full and accurate description of the preferred form of the invention shown and described herein. However, it is to be understood that certain changes as to the exact construction and combination of parts may be resorted to that fall within the scope of the appended claims.

What we claim is:

1. In a cultivator, a frame, a plow member carried by the frame, traction wheels for said frame, means for moving the frame and traction wheels with respect to each other, and assisting means for supplementing the operation of said last-mentioned means.

2. In a cultivator, a frame, cultivating members carried by said frame, an axle pivotally secured to the frame, traction wheels for the axle, an operating lever secured to the frame and connected with said axle for shifting the same to move the cultivating members into operative and inoperative position, and an assisting lever carried by the frame and connected with said axle for supplementing the operation of said first-mentioned lever.

3. In a cultivator, a frame, cultivating members carried by said frame, an axle pivotally secured to the frame, traction wheels for the axle, an operating lever secured to the frame and connected with said axle for shifting the same to move the cultivating members into operative and inoperative position, and an assisting lever carried by the frame and connected with said axle and adapted to move in the same direction as said operating lever for supplementing the effective operation of the latter after a predetermined time in the operation of said operating lever.

4. In a cultivator, a frame, cultivating members carried by said frame, an axle pivotally secured to the frame, traction wheels for the axle, an operating lever secured to the frame and connected with said axle for shifting the same to move the cultivating members into operative and inoperative position, an assisting lever carried by the frame and connected with said axle for supplementing the operation of said first-mentioned lever, and means connected with the axle and frame tending to hold the forward end of the frame downward and assisting in the moving of said cultivating members into operative position.

5. In a cultivator, a frame, cultivating means carried by the frame, a shaft rotatable on the frame and having its free ends formed to provide crank axles, traction wheels for said axle, means for raising and lowering said cultivating means into operative and inoperative positions comprising an operating lever pivoted to the frame, connecting means between said operating lever and one of said crank axles, an assisting lever pivoted to the frame and adapted to operate in unison and in the same direction as said operating lever, and a connection between said assisting lever and the other of said crank axles, said assisting lever being adapted to operate effectively after a predetermined period in the effective operation of said operating lever.

6. In a cultivator, a frame, cultivating means carried by the frame, a shaft rotatable on the frame and having its free ends formed to provide crank axles, traction wheels for said axle, means for raising and lowering said cultivating means into operative and inoperative positions comprising an operating lever pivoted to the frame, an adjustable connection between said operating lever and one of said crank axles, an assisting lever pivoted to the frame and adapted to operate in unison and in the same direction as said operating lever, and a connection between said assisting lever and the other of said crank axles, said assisting lever being adapted to operate effectively after a predetermined period in the effective operation of said operating lever.

In testimony whereof we have hereunto set our hands in presence of two subscribing witnesses.

WILLIAM J. ADAMS.
JAMES W. TOWNSEND.

Witnesses:
CHRISTOPHER C. ELLIS,
JAS. E. TULL.